US012227913B2

(12) United States Patent
Kainzmayer

(10) Patent No.: US 12,227,913 B2
(45) Date of Patent: Feb. 18, 2025

(54) MOBILE FOUNDATION FOR TOWER CRANES AND FAST-ERECTING CRANES

(71) Applicant: Thomas Kainzmayer, Pfaffstätten (AT)

(72) Inventor: Thomas Kainzmayer, Pfaffstätten (AT)

( * ) Notice: Subject to any disclaimer, the term of this patent is extended or adjusted under 35 U.S.C. 154(b) by 376 days.

(21) Appl. No.: 17/648,720

(22) Filed: Jan. 24, 2022

(65) Prior Publication Data

US 2022/0243419 A1 Aug. 4, 2022

(30) Foreign Application Priority Data

Feb. 1, 2021 (AT) .............. A 50061/2021

(51) Int. Cl.
E02D 27/44 (2006.01)
E04F 15/06 (2006.01)
E04H 3/28 (2006.01)
E21B 15/00 (2006.01)

(52) U.S. Cl.
CPC .............. *E02D 27/44* (2013.01); *E04F 15/06* (2013.01); *E04H 3/28* (2013.01); *E21B 15/00* (2013.01)

(58) Field of Classification Search
CPC . E02D 27/44; E04F 15/06; E04H 3/28; E21B 15/00
See application file for complete search history.

(56) References Cited

U.S. PATENT DOCUMENTS

| 4,759,162 | A * | 7/1988 | Wyse ................... E04H 3/24 52/126.6 |
| 9,447,643 | B2 * | 9/2016 | Jack ....................... E02D 27/36 |
| 9,732,564 | B2 * | 8/2017 | Jack ......................... E02D 27/44 |
| 10,233,059 | B1 * | 3/2019 | Anzola .................... E02D 27/44 |
| 10,364,134 | B2 * | 7/2019 | Anzola .................... E02D 27/44 |
| 11,591,802 | B1 * | 2/2023 | Valore .................... E04F 11/035 |
| 2012/0255256 | A1 * | 10/2012 | Montalto ............ E04G 21/3209 52/650.3 |
| 2019/0152749 | A1 * | 5/2019 | Anzola .................... E02D 27/44 |
| 2022/0243419 | A1 * | 8/2022 | Kainzmayer .......... B60K 15/03 |

FOREIGN PATENT DOCUMENTS

| AU | 2016102095 A4 | 1/2017 |
| CN | 201850558 U | 6/2011 |
| CN | 202346643 U | 7/2012 |
| CN | 207003465 U | 2/2018 |
| CN | 209353366 U | 9/2019 |
| CN | 209923966 U | 1/2020 |
| CN | 111321754 A * | 6/2020 |
| CN | 111663558 A | 9/2020 |

* cited by examiner

*Primary Examiner* — Andrew J Triggs
(74) *Attorney, Agent, or Firm* — Workman Nydegger

(57) ABSTRACT

The mobile foundation for tower cranes and fast-erecting cranes comprises at least two floor elements made from metal, which may be releasably connected to one another, in particular screwed to one another, wherein the floor elements have anchoring devices for a crane tower. Transportable, reusable ballast weights may be supported on at least one support surface of the foundation. There is provided a passage element having uprights and/or side walls, wherein the uprights or side walls, respectively, have a height of at least 2.1 m, preferably of at least 2.3 m, wherein the passage element may be releasably connected to the floor elements, in particular screwed thereto.

21 Claims, 4 Drawing Sheets

MOBILE FOUNDATION FOR TOWER CRANES AND FAST-ERECTING CRANES

BACKGROUND OF THE INVENTION

The invention relates to a mobile foundation for tower cranes and fast-erecting cranes. Currently, there have to be cast concrete foundations for the temporary erection of tower cranes and fast-erecting cranes in order to distribute the forces of the crane uniformly via foundation anchors or foundation crosses, respectively, onto the ground. These concrete foundations, however, have to be destroyed, loaded, transported off and disposed of upon completion of the construction site and disassembly of the crane.

This sort of erecting crane foundations is uneconomic as well as ecologically questionable when taking into account that the production of 1 m³ concrete is associated with about 1,000 kg $CO_2$ load for the environment and that the foundation plate of a medium-sized crane is typically composed of 20-40 m³ reinforced concrete and may only be used once. Furthermore, the foundation plate and the foundation anchors damage pavements and parts of the road, which will have to be repaired following the destructive removal of the concrete foundation.

Another disadvantage of conventional crane foundations made from concrete is that the concrete foundations require heights of 75-150 cm in order to ensure the necessary strength and distribution of the crane loads. Such high concrete foundations, however, block the pavements, i.e. pedestrian traffic will have to move onto the street or to the opposite street side. Also vehicle traffic is impaired by necessary constriction or closure of road lanes.

It is the task of the present invention to overcome the disadvantages described of the known crane foundations made from concrete. It is in particular the task of the present invention to provide for omitting the conventional concrete foundations, foundation anchors or foundation crosses, respectively.

BRIEF SUMMARY OF THE INVENTION

The invention solves the task posed by providing a mobile foundation for tower cranes and fast-erecting cranes having the features of claim 1. Advantageous embodiments of the invention are depicted in the sub-claims, the description and the drawings.

The mobile foundation according to the invention for tower cranes and fast-erecting cranes is characterized by at least two floor elements made from metal, which may be releasably connected to one another, in particular screwed to one another, wherein the floor elements have anchoring devices for a crane tower.

Due to the modular configuration of the foundation, the floor elements are sufficiently small and light to be taken to the construction site by means of trucks and to be connected to one another there on-site in order to provide the necessary support surface for a crane. The delivery of the modular components of the foundation may be realized together with the delivery of the crane components to the construction site, which is why there will not be required an additional transport.

The reusability of all components of the inventive foundation significantly reduces the costs in comparison to conventional concrete foundations that may be used only once.

The floor elements may preferably be connected to one another at the side walls thereof by the side walls having through-holes for screws, wherein the positions of the through-holes in the side walls of the floor elements correspond to one another. In this way, the floor elements may be arranged side-by-side and the through-holes in the side walls of the floor elements may be aligned with one another. Subsequently, the floor elements are connected to one another by way of screws and nuts.

In order to provide floor elements having low weight but high strength and rigidity, there is provided in an embodiment of the invention that each floor element comprises beams that are connected to one another, in particular welded to one another. The desired high strength and rigidity are obtained in particular if at least some of the beams are configured as H-beams or T-beams.

The strength and rigidity of the floor elements may be further increased if the floor elements have cover plates and/or base plates, which are connected to at least some of the beams. In order to maintain the weight of the floor elements rather low, the cover plates and/or the base plates may have recesses. These recesses also facilitate accessibility to the side walls of the floor elements to connect floor elements arranged adjacently to one another to the side walls facing one another. It is further useful that the cover plates and/or base plates have the anchoring devices for a crane tower.

In order to render the inventive mobile foundation for tower cranes and fast-erecting cranes in spite of the comparably low weight thereof sufficiently stable against wind loads and net crane loads, which act on a crane mounted on a foundation, the invention envisages that the mobile foundation have transportable ballast weights and at least one support surface for the transportable ballast weights. The ballast weights may be taken to the construction site by truck and supported onto the support surface of the mobile foundation on site, whereby a simple assembly and disassembly of the mobile foundation is being ensured.

In order to utilize pavements, on the one side, as a support surface for the mobile foundation for tower cranes and fast-erecting cranes and, on the other side, to continue to keep open these pavements for pedestrian traffic, there is provided in a preferred embodiment of the invention a passage element having uprights and/or side walls, wherein the clear height between the uprights or side walls, respectively, has a height of at least 2.1 m, preferably of at least 2.3 m, wherein the passage element may be releasably connected to the floor elements, in particular screwed thereto. In order to configure the passage element as rigid and strong as possible, there is envisaged that the passage element has the uprights having beams connectable to one another at the upper end thereof, wherein the beams form a support for transportable ballast weights. In order to protect pedestrians walking through the passage element against parts falling down, against dirt or rainwater, it is useful if the uprights carry a cover plate at the upper end thereof, wherein the cover plate forms a support for transportable ballast weights. The cover plate may be directly connected to the uprights, or to the beams mentioned. The cover plate may also contribute to the constructive rigidity and strength of the passage element. As an alternative to the cover plate, also the ballast weights supported on the passage element may offer protection to pedestrians.

For the passage element being practically useable, the height of the floor elements should be rather low. The invention, hence, provides in an embodiment that floor elements of the foundation have a height of a maximum of 70 cm, preferably of a maximum of 50 cm, more preferably of a maximum of 40 cm. In addition, it is useful if the foundation with the floor elements in the region of the passage element has ramp elements that may be releasably connected thereto, the width of which corresponding at least to the clear width of the passage element. By way of this measurement, the passage element may be continuously utilized. As an alternative to ramp elements, also stair elements may be provided for bridging the height difference between the ground and the floor of the passage element.

The floor elements and the passage element are preferably composed of steel.

For a rapid and secure mounting of a crane tower at the inventive mobile foundation for tower cranes and fast-erecting cranes, it is useful if the anchoring devices for the crane tower comprise through-holes or threaded holes in the floor elements and optionally mechanical protection elements against unscrewing of nuts or holding elements attached at the floor elements, in particular clamps.

BRIEF DESCRIPTION OF THE DRAWINGS

The invention is now explained in greater detail by way of an exemplary embodiment in reference to the drawings. The drawings show.

DETAILED DESCRIPTION OF THE PREFERRED EMBODIMENTS

Figure 1:
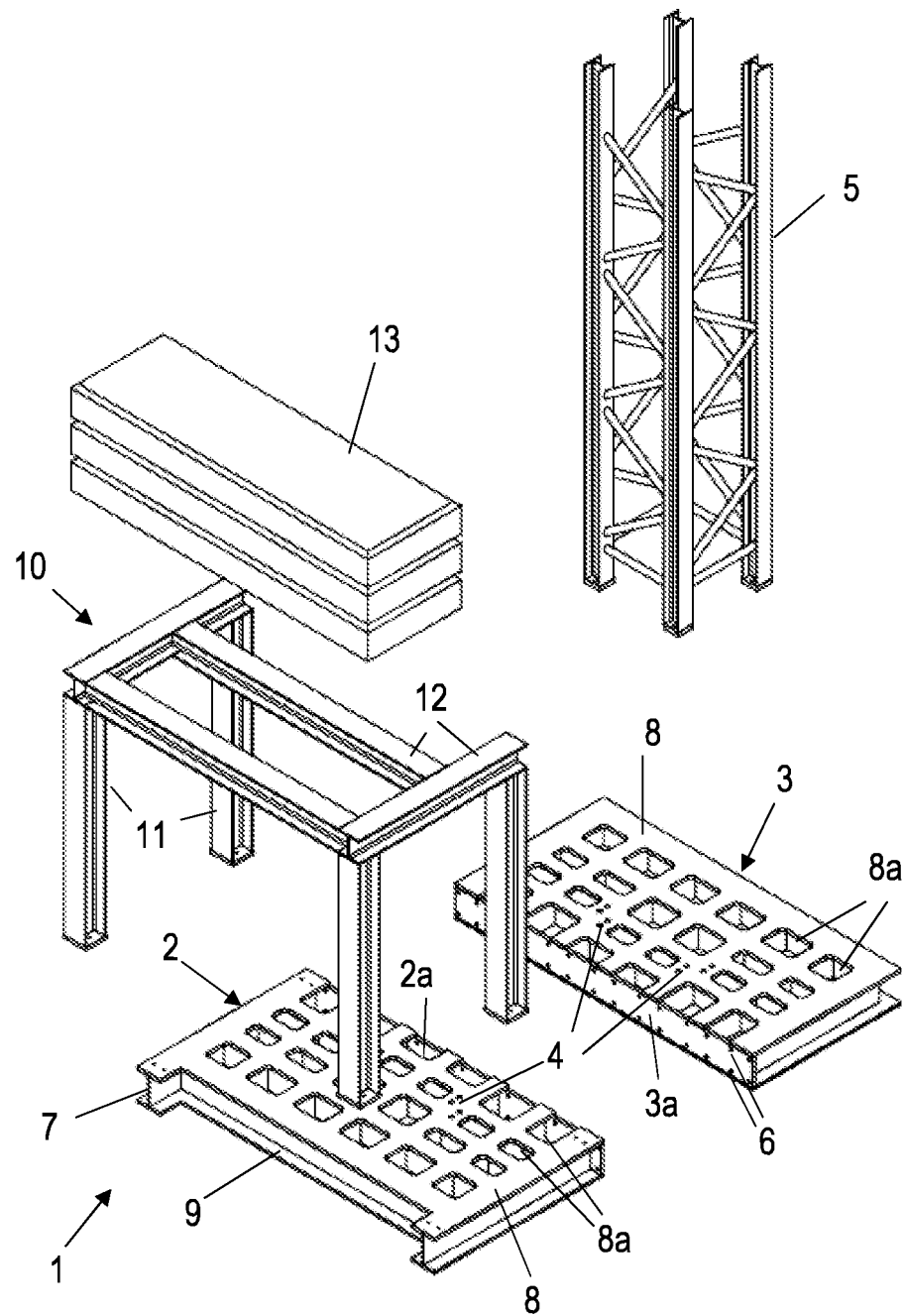
FIG. 1 and FIG. 2 schematic perspectives of the essential components of the inventive mobile foundation for tower cranes and fast-erecting cranes.
Figure 2:
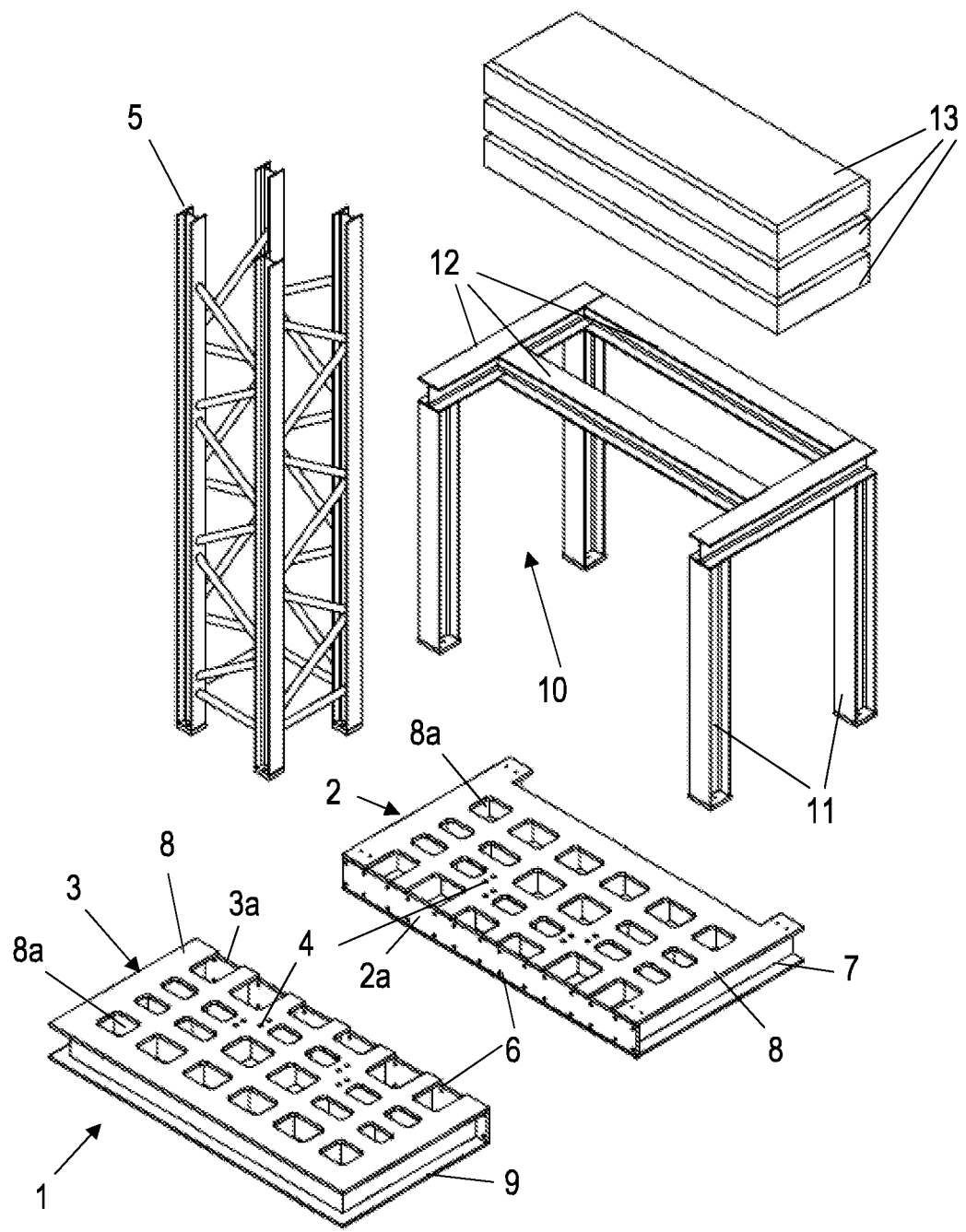
Figure 3:
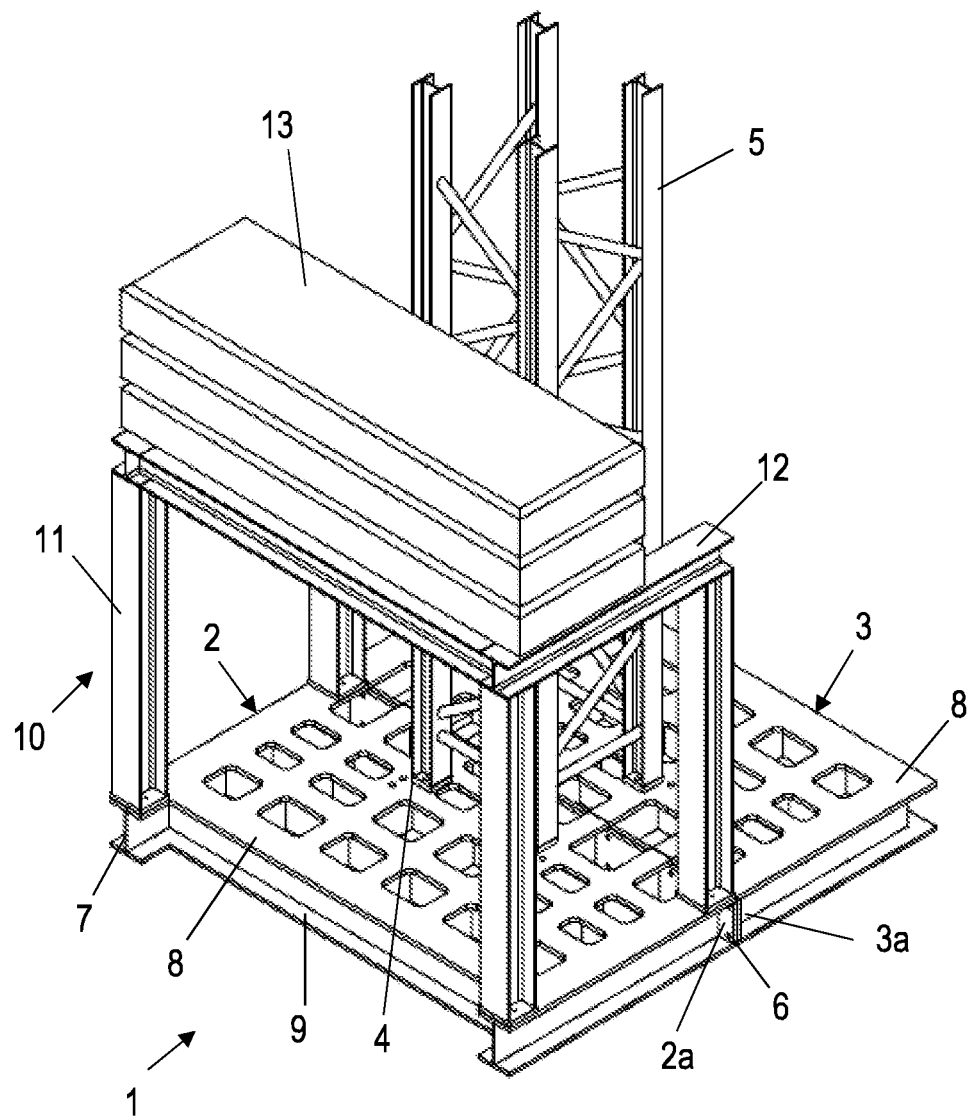
FIG. 3 and FIG. 4 schematic perspectives of the inventive mobile foundation for tower cranes and fast-erecting cranes in the assembled condition.
Figure 4:
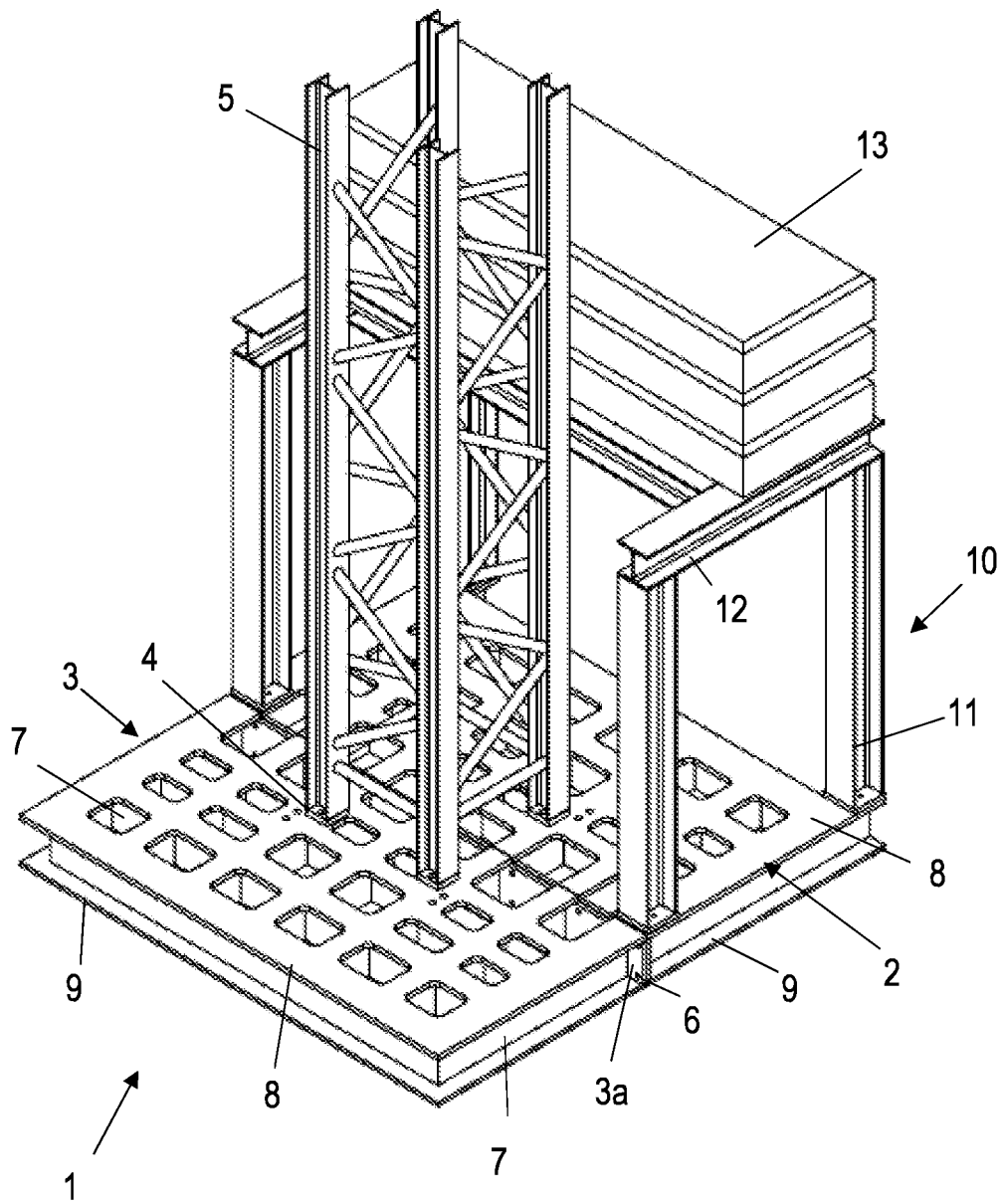

The exemplary embodiment depicted in the FIGS. 1 to 4 of the inventive mobile foundation for tower cranes and fast-erecting cranes comprises two floor elements 2, 3 made from metal, which may be releasably connected to one another, in particular screwed to one another. The floor elements have anchoring devices 4 for a crane tower 5. The anchoring devices 4 for the crane tower 5 are configured as through-holes, optionally having protection elements against unscrewing of nuts, they may, however, alternatively also comprise holding elements, in particular clamps, attached to the floor elements 2, 3. The crane tower is not an integral part of the present invention but rather a part of a tower crane or fast-erecting crane, for which the foundation 1 forms a temporary foundation.

The floor elements 2, 3 have side walls 2a, 3a, at which they may be connected to one another. For this purpose, there are provided in the side walls 2a, 3a through-holes 6, wherein the positions of the through-holes 6 in the side walls 2a, 3a of the floor elements 2, 3 correspond to one another such that in the case of an arrangement side-by-side of the side walls 2a, 3a of the floor elements 2, 3 the through-holes 6 may be aligned with one other in order to subsequently connect the side walls 2a, 3a releasably to one another by way of screws or bolts passed through the through-holes 6. The floor elements 2, 3 comprise beams 7 that are connected to one another, in particular welded to one another. At least some of the beams 7 may be configured as H-beams or T-beams. The floor elements 2, 3 further have cover plates 8 and base plates 9, which are connected to at least some of the beams 7. Instead of the configuration of H-beams or T-beams, the cover plates 8 and the base plates 9 may be welded to vertically arranged plates or I-beams. In order to reduce weight, the cover plates 8 have recesses 8a. The anchoring devices 4 for the crane tower 5 are configured within the cover plates 8. In this way, there is achieved a uniform distribution onto the ground of forces introduced from the crane tower 5 into the foundation 1.

The mobile foundation 1 for tower cranes and fast-erecting cranes further comprises a passage element 10 having vertical uprights 11. As an alternative or addition to the uprights 11, the passage elements 10 may be configured having side walls (not depicted in the drawings). The clear height between the uprights 11 or the side walls, respectively, is at least 2.1 m, preferably at least 2.3 m. The uprights 11 are connected at the upper end thereof to beams 12, e.g., H-beams. In order to increase strength and stability, there may additionally be provided beam members not depicted in the drawing. The beams 12 form a support for transportable, reusable ballast weights 13, which may serve for weighing down the mobile foundation 1. As a supplement or an alternative, the ballast weights 13 may also be supported on the floor elements 2, 3, in particular also on the cover plates 8. The stability of the crane will be ensured by these reusable ballast elements 13.

The passage element 10 may be screwed to the floor element 2. For the passage element 10 being passed through by pedestrians without any effort, the floor elements 2, 3 are configured having a height of a maximum of 50 cm, preferably of a maximum of 40 cm. In order to make the passage element 10 also usable for strollers, wheelchairs etc., there is provided a continuous trafficability by the foundation 1 being provided laterally of the floor elements 2, 3 with ramp elements arranged in the region of the passage element 10 and not depicted in the drawings. The width of the ramp elements shall be at least as large as the clear width of the passage element 10.

The floor elements 2, 3 and the components of the passage element 10 are preferably composed of steel parts of the required quality.

What is claimed is:

1. A mobile foundation for tower cranes and fast-erecting cranes, comprising:
   two floor elements made from metal including anchoring devices for a crane tower, which floor elements are configured to be releasably connected to one another,
   wherein the floor elements are connected to one another at their side walls by the side walls having through-holes for screws or bolts, wherein positions of the through holes in the side walls of the floor elements correspond to one another and are configured to be aligned with one another in a case of a side-by-side arrangement of the floor elements, wherein the screws or bolts are insertable through the alignment through holes for direct connection of the floor elements,
   wherein each floor element comprises beams connected to one another by welding,
   wherein each floor element includes plates, selected from cover plates, floor plates, or a combination of cover plates and floor plates, which plates are connected to at least some of the beams.

2. The mobile foundation for tower cranes and fast-erecting cranes according to claim 1, wherein at least some of the beams are configured as H-beams or T-beams.

3. The mobile foundation for tower cranes and fast-erecting cranes according to claim 1, wherein the plates include recesses.

4. The mobile foundation for tower cranes and fast-erecting cranes according to claim 1, wherein the plates include the anchoring devices for a crane tower.

5. The mobile foundation for tower cranes and fast-erecting cranes according to claim 1, wherein the mobile foundation has transportable ballast weights and at least one support surface for the transportable ballast weights.

6. The mobile foundation for tower cranes and fast-erecting cranes according to claim 1, a passage element having uprights is provided, wherein a clear height between the uprights has a height of at least 2.1 m, or at least 2.3 m, wherein the passage element is configured to be releasably connected to the floor elements or screwed thereto.

7. The mobile foundation for tower cranes and fast-erecting cranes according to claim 6, wherein the passage element has the uprights having beams connected to one another at the upper end thereof, wherein the beams form a support for transportable ballast weights.

8. The mobile foundation for tower cranes and fast-erecting cranes according to claim 7, wherein the passage element has additional strut members.

9. The mobile foundation for tower cranes and fast-erecting cranes according to claim 6, wherein the uprights carry a cover plate at the upper end thereof, wherein the cover plate forms a support for transportable ballast weights.

10. The mobile foundation for tower cranes and fast-erecting cranes according to claim 1, wherein floor elements have a height of a maximum of 70 cm, or of a maximum of 50 cm, or of a maximum of 40 cm.

11. The mobile foundation for tower cranes and fast-erecting cranes according to claim 6, wherein the foundation with the floor elements in the region of the passage element has ramp or stair elements that are configured to be releasably connected and a width of which corresponds to at least a clear width of the passage element.

12. The mobile foundation for tower cranes and fast-erecting cranes according to claim 6, wherein the floor elements are composed of steel.

13. The mobile foundation for tower cranes and fast-erecting cranes according to claim 9, wherein the passage element is composed of steel.

14. The mobile foundation for tower cranes and fast-erecting cranes according to claim 1, wherein the anchoring devices for the crane tower comprise through-holes or threaded holes in the floor elements, or holding elements attached at the floor elements.

15. The mobile foundation for tower cranes and fast-erecting cranes according to claim 14, the mechanical protection elements comprising clamps.

16. The mobile foundation for tower cranes and fast-erecting cranes according to claim 1, wherein the floor elements are screwed to one another.

17. The mobile foundation for tower cranes and fast-erecting cranes according to claim 1, wherein the plates include the anchoring devices for a crane tower.

18. The mobile foundation for tower cranes and fast-erecting cranes according to claim 1, a passage element having side walls is provided, wherein a clear height between the side walls has a height of at least 2.1 m, or at least 2.3 m, wherein the passage element is configured to be releasably connected to the floor elements or screwed thereto.

19. The mobile foundation for tower cranes and fast-erecting cranes according to claim 18, wherein the foundation with the floor elements in the region of the passage element has ramp or stair elements that are configured to be releasably connected and a width of which corresponds to at least a clear width of the passage element.

20. The mobile foundation for tower cranes and fast-erecting cranes according to claim 18, wherein the passage element is composed of steel.

21. The mobile foundation for tower cranes and fast-erecting cranes according to claim 1, wherein the anchoring devices for the crane tower comprise mechanical protection elements against unscrewing of nuts.

\* \* \* \* \*